Patented Aug. 17, 1937

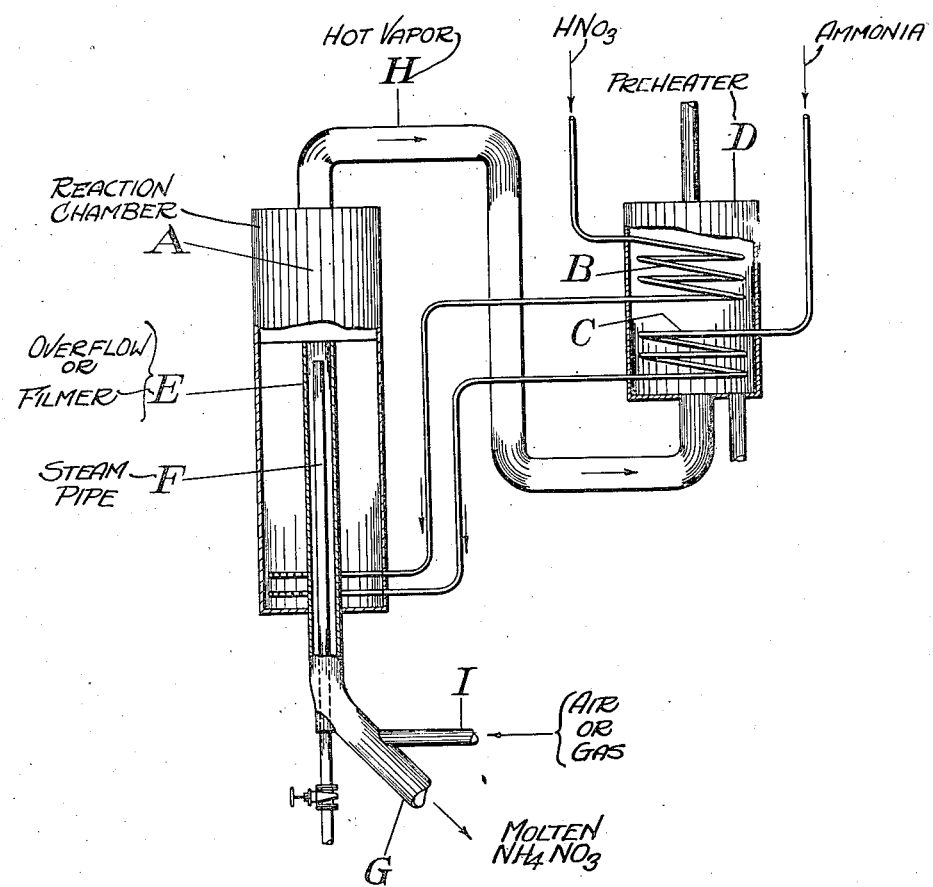

2,089,957

UNITED STATES PATENT OFFICE 2,089,957

MANUFACTURE OF SALTS

George J. Harris and John Douglas Converse, McMasterville, Quebec, Canada, assignors to E. I. du Pont de Nemours & Company, Wilmington, Del., a corporation of Delaware Application September 3, 1932, Serial No. 631,658
Renewed October 30, 1936. In Canada September 11, 1931

3 Claims. (Cl. 23—103)

Our invention relates to a continuous process for the manufacture of salts, the formation of which is accompanied by the evolution of heat, with subsequent utilization of the heat of reaction to vaporize volatile solvents and constituents. Our invention also relates to a new and improved form of apparatus for carrying out exothermic chemical reactions in which non-volatile products are separated from volatile constituents. More particularly, our invention relates to a continuous process for the manufacture of ammonium nitrate.

In the manufacture of salts by the reaction of two solutions flowing together, considerable water or other solvent is always present, which must be evaporated before the dry salt can be obtained. The removal of this solvent by evaporation requires considerable heat, and, in some cases, sufficiently high temperatures to decompose a portion of the product.

In many such reactions, for example in the flowing together of acid and alkali solutions, a considerable amount of heat is developed. The reaction between nitric acid and ammonia is an example of such an exothermic reaction, for which our process is particularly applicable. Both ammonia and nitric acid are volatile materials, and, in the concentration of ammonium nitrate solutions formed from these materials, there is a considerable loss of vapors in the neutralization and evaporation, regardless of whether the reacting mixture is kept on the acid or the alkaline side.

In the usual batch process for the manufacture of ammonium nitrate, there is considerable interruption to the operation of the process during the transfer of the charge from the neutralizer to the evaporator. This not only means a partial loss of the heat liberated during the neutralization, but it is customary in many cases actually to cool the charge. Since addition of heat is subsequently required for the evaporation of water, this loss of heat is a distinct disadvantage and expense.

An object of our invention is a process for the production of salts, the formation of which is accompanied by the evolution of heat, in which the heat of reaction is utilized for the concentration of the salt solution. A further object is to provide a continuous process requiring no transfer of materials from one vessel to another, prior to obtaining a salt with a very low water content. A still further object is the manufacture of ammonium nitrate by such a process. Another object is to provide suitable equipment for carrying out our process. Further objects of our invention will be apparent as the description proceeds.

According to our invention a new and improved process has been produced for the production of exothermic salts in which two reactants come together in a reaction chamber. We have found our process particularly applicable to the production of ammonium nitrate, in which case nitric acid and ammonia react together in a neutralizing chamber.

We have discovered that molten ammonium nitrate containing less than 3% moisture can be continuously manufactured from 60% nitric acid and gaseous ammonia in an economical and satisfactory manner by continuously introducing the reactants, preferably with slight excess of ammonia, into a chamber where the heat of reaction boils off most of the water, and exposing the hot products to the action of an inert gas to remove further water and excess ammonia. We have found that the solvent and volatile constituents in the product may be continuously removed from non-volatile products of exothermic reactions by utilizing the heat of reaction with considerable increase in efficiency and economy over processes used heretofor. Furthermore, we have developed new and improved equipment for carrying out such exothermic processes.

In our process as applied, for example, to the manufacture of ammonium nitrate, ammonia and nitric acid are fed continuously to a reaction chamber where the heat of neutralization causes the mixture to boil, thereby vaporizing a large portion of the water present. The hot concentrated ammonium nitrate solution flows continuously, preferably in the form of a film of liquid down the inner surface of a heated overflow means which may be located within the reaction chamber and thereby heated by the surrounding mixture. Inert gas passes upward through this overflow to increase the efficiency of evaporation from the surface of the film.

We find it desirable in some cases to start the process with a heel of ammonium nitrate solution in the neutralizer from a previous operation, although in starting with an empty neutralizer a heel of the acid may be run in for this purpose.

In carrying out the neutralization process we have found it advantageous to so control the rate of addition of nitric acid and ammonia that no great excess of either is present at any time. We have, however, found it advantageous to maintain the solution in the neutralizer slightly on the ammoniacal side, because a slight excess of ammonia produces a much more regular and even rate of discharge of the product from the reacting chamber. There are further advantages in operating with a slight excess of ammonia in that fogging is prevented and the corrosive effect on the container is reduced or minimized. While operating the process in this manner results in some ammonia vapors escaping with the hot gases from the neutralizer, these vapors may be recovered and returned to the system by various methods.

If the acid and ammonia contain relatively small amounts of water, it may not be necessary to heat these before they are allowed to react in order to obtain a sufficiently concentrated fused salt. However, in most cases, in order to obtain a salt with minimum water content, it is necessary to heat the acid and ammonia before they enter the reaction chamber. While this might be accomplished by external heat, the water vapor leaving the neutralization chamber carries more than sufficient heat for this purpose so that by passing the vapors from the reaction chamber in heat exchange relation with the entering ammonia and acid, they may be heated without the addition of external heat.

It is extremely difficult to remove the last of the water since the boiling point of a solution containing less than 5% or 10% water is so high at atmospheric pressure that the nitrate itself begins to decompose with the loss of valuable material. By allowing the molten ammonium nitrate to flow over a hot surface, or through a heated outflow conduit, in a condition of high surface exposure, such as for example in the form of a thin film, it is possible, by passing a current of inert gas in contact with this hot film, to evaporate further amounts of water, and remove remaining traces of excess ammonia. While the hot outflow surface over which the product passes may be heated by external means, we have found that it may be constructed as part of the reaction chamber so that it is heated by the hot reacting products, and additional heat may not be necessary.

While the heat of neutralization in our process may be the only source of heat, and will be sufficient to bring the solution to the boiling point, we may hasten the evaporation by supplying heat from an external source. For example, steam coils may be introduced into the neutralizer. We prefer, however, to supply additional heat by means of a steam pipe or coil passing up concentrically within the overflow means, thereby introducing the heat at the place of greatest effectiveness. In cases where the nitric acid is weaker than 60% or aqua ammonia is used, it is advisable to introduce external heat for the removal of the additional quantity of water.

An apparatus suitable for carrying out our invention is illustrated in the accompanying drawing. "A" is the neutralizer or reaction chamber into which nitric acid and ammonia are continuously fed through pipes "B" and "C" respectively which conduct the reactants through the preheater "D" and terminate in distributors to facilitate thorough mixing in the bottom portion of the reaction chamber "A". "E" is an overflow means for conducting the neutralized product in the form of a film continuously down and out of the neutralizer. "F" is a steam pipe extending upwardly inside of overflow "E" providing additional heat to assist in the operation of the film evaporation. "G" is the exit conducting the molten ammonium nitrate to any suitable means for graining or solidifying or otherwise disposing of the product. The conduit "H" conducts the hot vapors to the heat exchanger "D". "I" is a means for introducing air or inert gas to assist in the removal of vapors from the film of liquid in "E".

If desired, heating coils may be provided below the surface of the liquid in the reaction vessel "A" to supplement the heat of reaction. This is especially applicable in cases where it is necessary to evaporate larger quantities of water as for instance when using nitric acid weaker than 60% or using aqua ammonia. Means may be provided for preheating the inert gases, thereby greatly increasing the effectiveness of the film evaporator in removing the last traces of moisture and any excess ammonia which may be present. Means may also be provided for introducing the inert gases either above or below the surface of the boiling liquid in the chamber "A" to assist in the evaporation at this point.

While the equipment may be constructed of any suitable materials, we have found chrome steel to be satisfactory for resisting corrosion and producing a pure product.

Using such an apparatus and process, many advantages are obtained over methods previously in use. The efficiency of the neutralization process is greatly increased, and a great saving in time and steam consumption is effected. For example in the batch process, the steam requirements would be 50 to 100 pounds of steam at 100 pounds pressure per 100 pounds ammonium nitrate. The process and apparatus herein described on the other hand, requires less than 20 pounds of steam per 100 pounds of ammonium nitrate. It is possible by the above process and equipment to obtain a fused salt containing less than 2% moisture.

In the batch process or other continuous processes, it has been necessary to maintain a rather large body of molten nitrate at a relatively high temperature for a considerable period of time. Under these conditions, the ammonium nitrate decomposes and there is appreciable loss of valuable materials. This is overcome by the present process since the reaction chamber can be very small as compared with that required in previous processes and contain only a small amount of molten material, the space being only that necessary to obtain thorough mixing.

While we have described our invention in the foregoing with particular reference to ammonium nitrate, it should be understood that it may be applied to the manufacture of many compounds where a volatile and non-volatile component are to be separated, and particularly where the reaction is exothermic. It is particularly applicable also, of course, in the manufacture of other ammonium salts such as ammonium chloride and ammonium sulphate. The manufacture of sodium sulfite from sodium hydroxide and sulfur dioxide may also be carried out advantageously by this process.

While we prefer to operate with a solution on the alkaline side in the manufacture of ammonium nitrate for the reason that ammonia is a volatile constituent, it is apparent that it should be advantageous to work on the acid side in the case of sodium sulphite.

It will be apparent from the foregoing that certain steps in the above complete process may be used independently with some advantages without departing from the spirit of the invention. Many modifications may, therefore, be made in the above example, or many different applications may be made of it, without departing from the spirit of the invention. We, therefore, do not intend to limit ourselves, except as indicated in the following claims:

We claim:

1. In a process for the manufacture of salts producible by exothermic reaction and thermally stable at the temperature of operation, said reaction producing a solution of said salt and volatile constituents, from which said salt is to be separated, the method of removing said constituents which method comprises withdrawing solution from the body thereof and, incidental to and coincident with such withdrawal, immediately spreading the solution being withdrawn into film form to give the same high surface exposure, and forthwith heating said film by heat transfer from the body of said solution, thus substantially fully conserving the heat of reaction, while contacting said film with a flow of inert gas along the surface thereof.

2. In a process for the manufacture of salts producible by exothermic reaction and thermally stable at the temperature of operation, said reaction producing a solution of said salt and volatile constituents, from which said salt is to be separated, the method of removing said constituents which method comprises allowing the heat of reaction to bring the solution to boiling, thereby utilizing the heat of reaction for partially expelling the volatile constituents, withdrawing solution from the body thereof and, incidental to and coincident with such withdrawal, immediately spreading the solution being withdrawn into film form to give the same high surface exposure and forthwith heating said film by heat transfer from the body of said solution, thus substantially fully conserving the heat of reaction, while contacting said film with a flow of inert gas along the surface thereof, thus additionally expelling volatile constituents.

3. The process of claim 1 in which said inert gas consists of air.

GEORGE J. HARRIS.
JOHN D. CONVERSE.